(12) United States Patent
Moore

(10) Patent No.: US 8,646,850 B2
(45) Date of Patent: Feb. 11, 2014

(54) WHEEL RIM WITH A BRAKE ROTOR

(75) Inventor: Wayne-Ian Moore, Changhua County (TW)

(73) Assignee: Ashima Ltd., Changhua County (TW)

( * ) Notice: Subject to any disclaimer, the term of this patent is extended or adjusted under 35 U.S.C. 154(b) by 644 days.

(21) Appl. No.: 12/962,669

(22) Filed: Dec. 8, 2010

(65) Prior Publication Data
US 2012/0146393 A1 Jun. 14, 2012

(51) Int. Cl.
*B60B 1/04* (2006.01)
*B60B 21/00* (2006.01)
*F16D 55/02* (2006.01)

(52) U.S. Cl.
USPC ............ 301/6.1; 301/6.8; 301/35.59; 301/78; 188/71.1

(58) Field of Classification Search
USPC ................ 301/6.8, 6.9, 6.1, 110.5, 35.59, 78; 188/71.1
See application file for complete search history.

(56) References Cited

U.S. PATENT DOCUMENTS

| 2,808,908 | A | * | 10/1957 | Lyon | 188/264 R |
| 3,542,166 | A | * | 11/1970 | Harrison | 188/218 XL |
| 3,709,561 | A | * | 1/1973 | De Biasse et al. | 301/6.8 |
| 4,662,482 | A | * | 5/1987 | Bass | 188/18 A |
| 5,383,539 | A | * | 1/1995 | Bair et al. | 188/218 R |
| 6,773,077 | B2 | * | 8/2004 | Buell et al. | 301/104 |
| 2002/0066627 | A1 | * | 6/2002 | Tsuge et al. | 188/218 XL |
| 2005/0056497 | A1 | * | 3/2005 | Idei et al. | 188/71.1 |
| 2005/0205365 | A1 | * | 9/2005 | Plantan et al. | 188/71.1 |
| 2010/0176651 | A1 | * | 7/2010 | Thomas et al. | 301/6.8 |
| 2012/0146393 | A1 | * | 6/2012 | Moore | 301/6.8 |
| 2013/0002005 | A1 | * | 1/2013 | Niebling et al. | 301/6.8 |
| 2013/0175849 | A1 | * | 7/2013 | Schmidt et al. | 301/6.8 |

* cited by examiner

Primary Examiner — Karen Beck

(57) ABSTRACT

A wheel rim with a brake rotor includes a wheel rim having two retaining walls respectively and annularly formed on two lateral sides thereof. An annular groove is annularly defined between the two retaining walls for adapting to retain a tire. The wheel rim has a plurality of support plates spacedly formed on one retaining wall and extending toward a center of the wheel rim to form a hub hole defined therein. The hub hole is axially located at the center of the wheel rim for adapting to assemble with a wheel hub. A brake rotor is concentrically connected with the wheel rim and mounted with the other retaining wall of the wheel rim for adapting to be clamped by a disc brake.

2 Claims, 5 Drawing Sheets

WHEEL RIM WITH A BRAKE ROTOR

BACKGROUND OF THE INVENTION

1. Field of the Invention

The present invention relates to a wheel rim with a brake rotor, particularly to a lightweight wheel rim having a brake rotor mounted thereon for providing a relatively larger braking torque.

2. Description of Related Art

A conventional bicycle disc brake rotor assembly is designed to be mounted to a wheel hub and usually comprises a rotor member which includes a first ring-shaped member and a pair of second ring-shaped members disposed on opposite sides of the first ring-shaped member. The second ring-shaped members have a material with higher wear resistance than the first ring-shaped member. At least one fixing hole is formed through the first ring-shaped member and the second ring-shaped members with at least one depression formed in the surface of one of the second ring-shaped members around the fixing hole. A rotor mounting member that is integrally formed with the hub has at least one fixing hole aligned with the at least one fixing hole of the rotor member. At least one fastener is mounted through the at least one fixing hole of the rotor member and the at least one fixing hole of the rotor mounting member to fixedly attach the rotor member to the rotor mounting member. A disc brake is attached to a front fork at a location near the rotor member.

When the disc brake applies a clamping force to the disc brake rotor, a braking torque is generated to stop the disc brake rotor from rotating. However, the conventional bicycle disc brake rotor has an outer diameter slightly larger than that of the wheel hub. The braking torque is not sufficient to generate a maximum braking effect. The amount of the braking torque is directly proportional to the size of the disc brake rotor. Therefore, the size of the conventional disc brake rotor is needed to be increased to achieve the better braking effort. Another disadvantage of the conventional disc brake rotor assembly is the weight. The heavier disc brake rotor contributes to the overall weight of the bicycle.

The present invention has arisen to mitigate and/or obviate the disadvantages of the conventional bicycle disc brake rotor assembly.

SUMMARY OF THE INVENTION

Accordingly, the main objective of the present invention is to provide an improved lightweight wheel rim with a brake rotor which provides a relatively greater braking torque.

To achieve the above objectives, the present invention provides a wheel rim with a brake rotor comprising a wheel rim and a brake rotor concentrically connected with the wheel rim. The wheel rim has two retaining walls respectively and annularly formed on two lateral sides thereof. An annular groove is annularly defined between the two retaining walls for adapting to retain a tire. The wheel rim has a plurality of support plates spacedly formed on one retaining wall and extending toward a center of the wheel rim to form a hub hole defined therein. The hub hole is axially located at the center of the wheel rim for adapting to assemble with a wheel hub. The other retaining wall has a plurality of first protrusions spacedly and radially formed on an inner periphery thereof. The first protrusions extend toward the center of the wheel rim.

The brake rotor has an outer diameter relatively and slightly smaller than that of the wheel rim. The brake rotor is mounted with the corresponding retaining wall of the wheel rim for adapting to be clamped by a disc brake. The brake rotor has a plurality of second protrusions radially formed on an outer periphery thereof and respectively corresponding to the first protrusions. Each second protrusion is coveringly connected with a lateral surface of the corresponding first protrusion and adapting to be fastened with the corresponding first protrusion by a fastener.

When the brake rotor is clamped by the disc brake, the brake rotor is able to generate a relatively greater braking torque for providing an efficient braking. Moreover, the wheel rim with the brake rotor is preferably made in a lightweight design.

In accordance with a second aspect of the present invention, the brake rotor has a hook portion annularly formed thereon and extending from an outer periphery thereof for buckling with the corresponding retaining wall of the wheel rim. The brake rotor is coveringly connected with a lateral surface of the corresponding retaining wall. The hook portion extends toward the annular groove and coveringly connected with an inner surface of the corresponding retaining wall, such that the brake rotor is mounted on the wheel rim.

Further benefits and advantages of the present invention will become apparent after a careful reading of the detailed description with appropriate reference to the accompanying drawings.

DETAILED DESCRIPTION OF THE INVENTION

Figure 1:
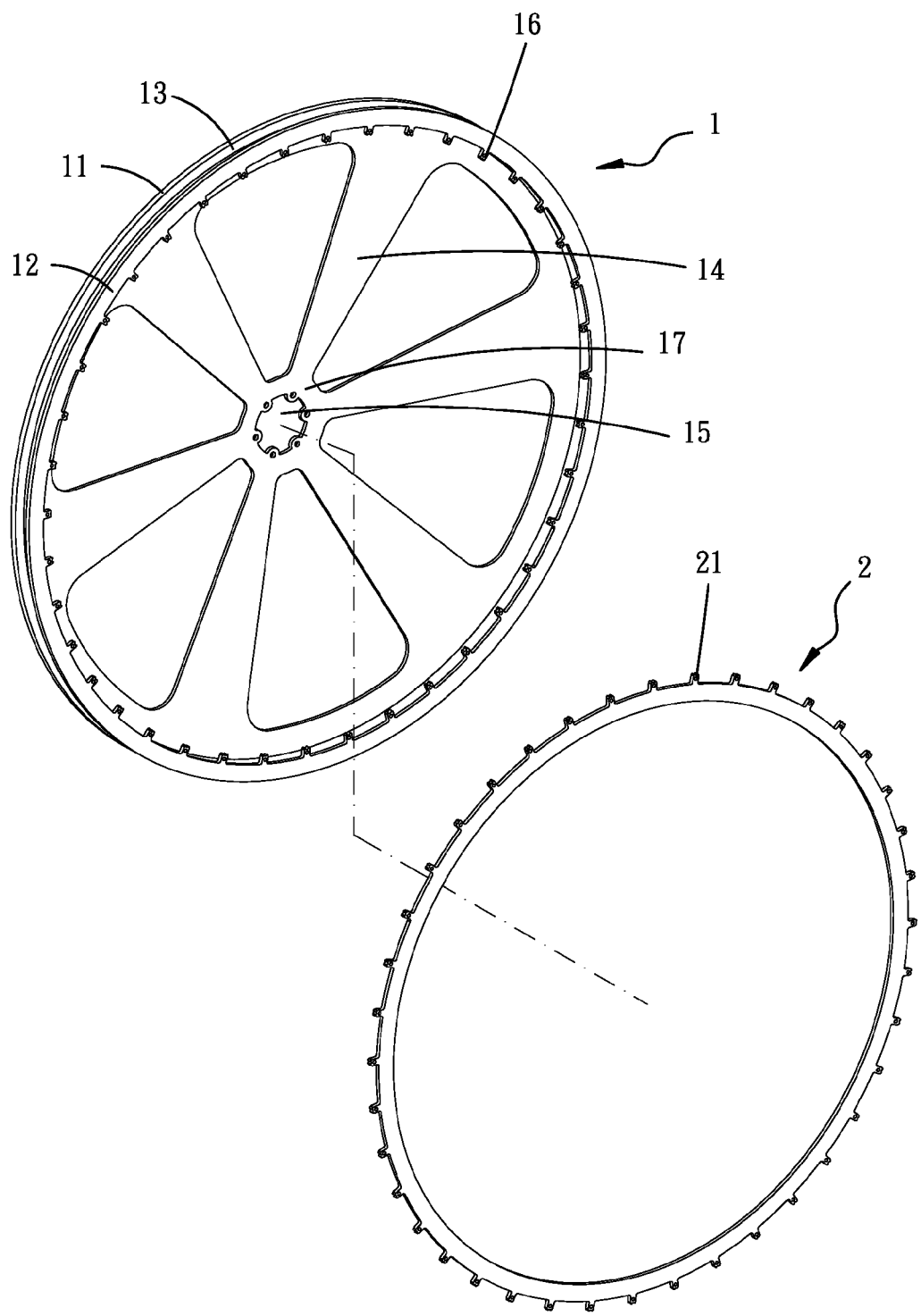
FIG. 1 is an exploded perspective view of a preferred embodiment of a wheel rim with a brake rotor in accordance with the present invention.
Figure 2:
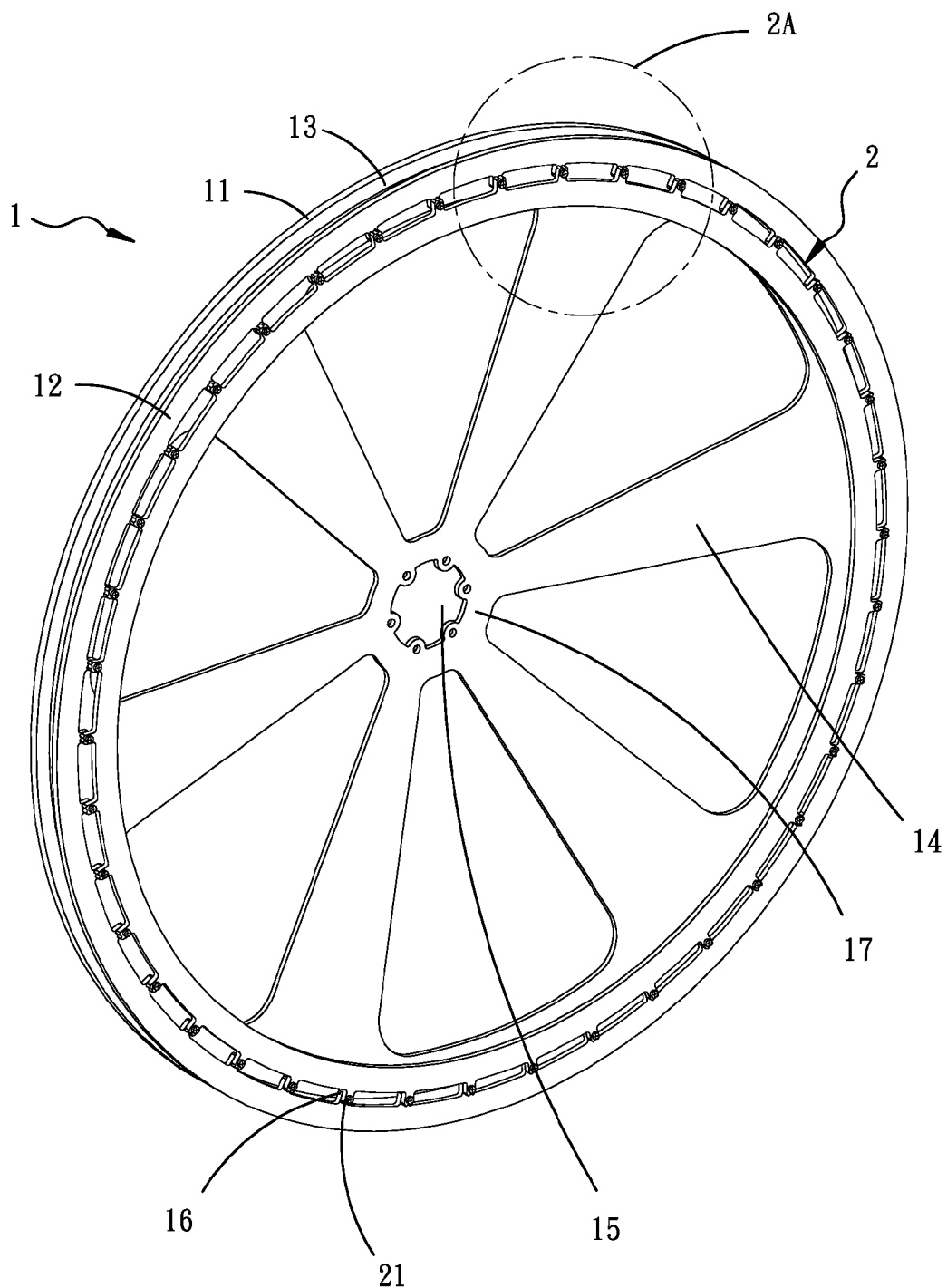
FIG. 2 is an assembled perspective view of the preferred embodiment of the wheel rim with a brake rotor in accordance with the present invention.
Figure 2A:
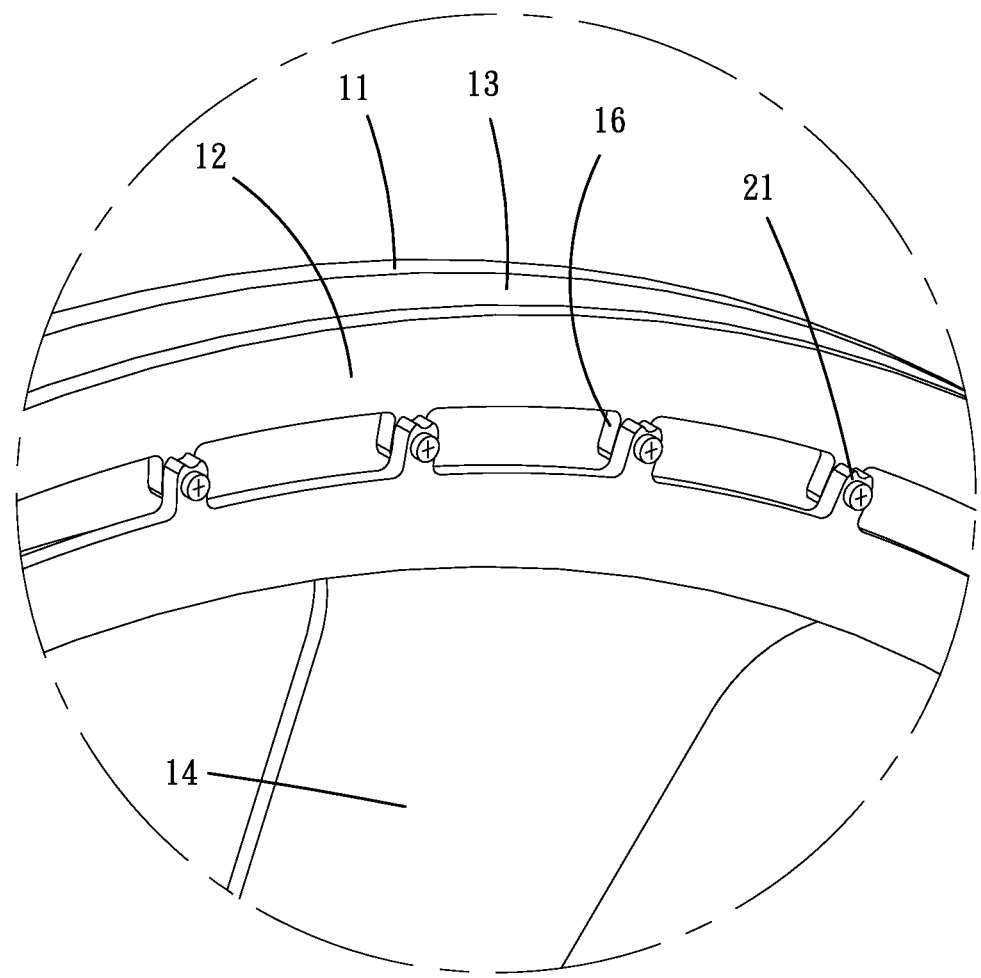
FIG. 2A is a partially enlarged view of the section 2A in FIG. 2 of the preferred embodiment of the wheel rim with a brake rotor in accordance with the present invention.
Figure 3:
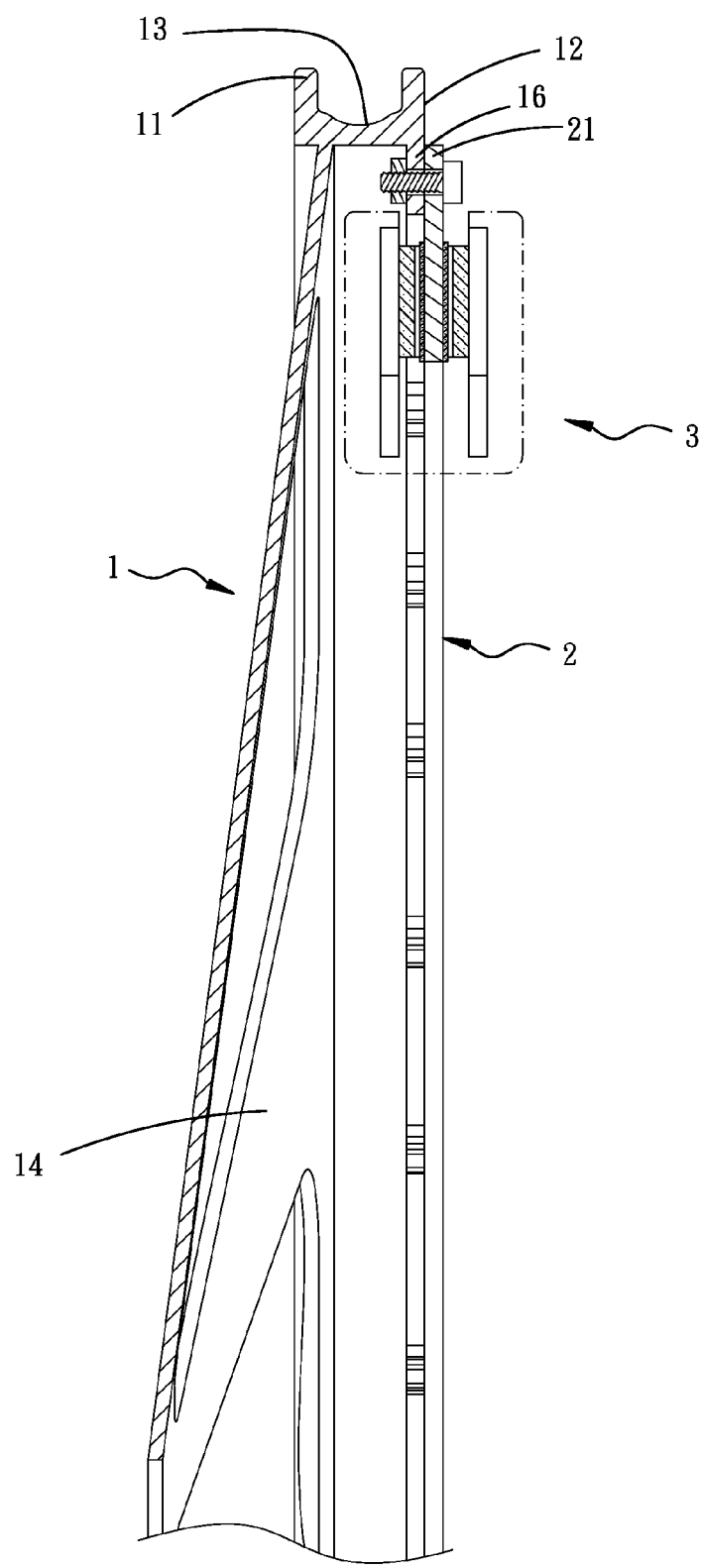
FIG. 3 is a partially cross-sectional view of the preferred embodiment of the wheel rim with a brake rotor in accordance with the present invention.

Referring to the drawings and initially to FIGS. 1-3, a wheel rim with a brake rotor in accordance with the present invention comprises a wheel rim (1) and a brake rotor (2) concentrically connected with the wheel rim (1). The wheel rim (1) has two retaining walls (11) respectively and annularly formed on two lateral sides thereof. An annular groove (13) is annularly defined between the two retaining walls (11) for adapting to retain a tire (not shown). The wheel rim (1) has a plurality of support plates (14) spacedly formed on one retaining wall (11) and extending toward a center of the wheel rim (1) to form a central portion (17). A hub hole (15) is axially defined in the central portion (17) and located at the center of the wheel rim (1) for adapting to assemble with a wheel hub (not shown). The other retaining wall (11) has a plurality of first protrusions (16) spacedly and radially formed on an inner periphery thereof. The first protrusions (16) radially extend toward the center of the wheel rim (1).

The brake rotor (2) is hollow and ring-shaped. The brake rotor (2) has an outer diameter relatively and slightly smaller than that of the wheel rim (1). The brake rotor (2) has a plurality of second protrusions (21) radially formed thereon and radially extending outward from an outer periphery thereof The second protrusions (21) respectively correspond to the first protrusions (16) of the wheel rim (1). Each second protrusion (21) is coveringly connected with a lateral surface of the corresponding first protrusion (16) and adapting to be fastened with the corresponding first protrusion by a fastener (not numbered), such that the brake rotor (2) is securely mounted on the wheel rim (1). The brake rotor (2) has a portion (not numbered) annularly formed thereon and located adjacent to the second protrusions (21) for adapting to be clamped by a disc brake (3).

As shown in FIG. 3, when the disc brake (3) clamps the portion (not numbered) of the brake rotor (2) and applies a clamping force to the brake rotor (2) which has a relatively larger diameter than that of prior art, the brake rotor (2) generates a relatively greater braking torque for providing an efficient braking. Moreover, the wheel rim (1) with the brake rotor (2) is preferably made in a lightweight design. The brake rotor (2) is able to be easily detached from or assembled with the wheel rim (1).

Figure 4:
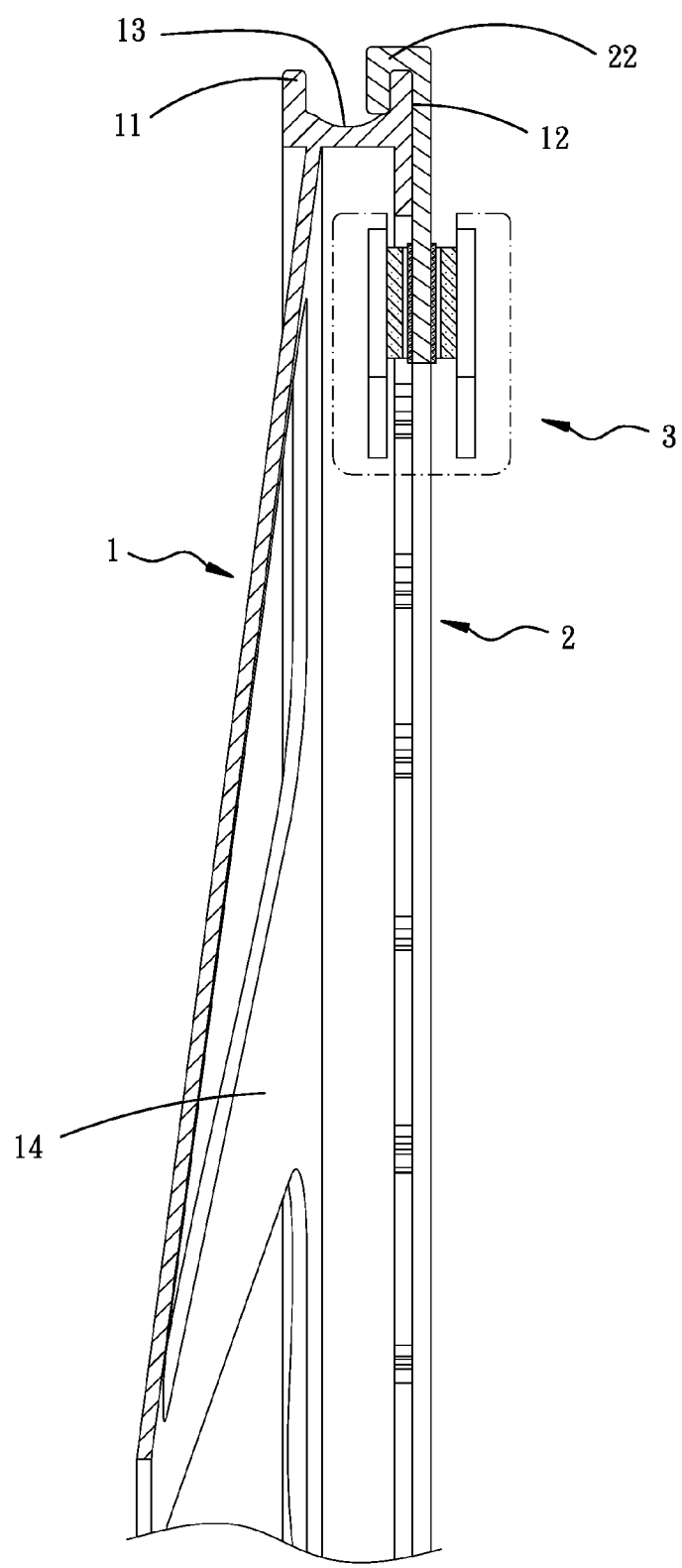
FIG. 4 is a partially cross-sectional view of a second embodiment of the wheel rim with a brake rotor in accordance with the present invention.

With reference to FIG. 4, this shows a second embodiment of the wheel rim with a brake rotor in accordance with the present invention. The elements and effects of the second embodiment which are the same with the preferred embodiment are not described, only the differences are described. In this embodiment, the brake rotor (2) has a hook portion (22) annularly formed thereon and extending from an outer periphery thereof for buckling with the corresponding retaining wall (11) of the wheel rim (1). The brake rotor (2) is coveringly connected with a lateral surface (12) of the corresponding retaining wall (11). The hook portion (22) extends toward the annular groove (13) and is coveringly connected with an inner surface of the corresponding retaining wall (11), such that the brake rotor (2) is securely mounted on the wheel rim (1).

Although the invention has been explained in relation to its preferred embodiment, it is to be understood that many other possible modifications and variations can be made without departing from the spirit and scope of the invention as hereinafter claimed.

What is claimed is:

1. A wheel rim with a brake rotor comprising:
   a wheel rim, the wheel rim having two retaining walls respectively and annularly formed on two lateral sides thereof, an annular groove annularly defined between the two retaining walls for adapting to retain a tire, the wheel rim having a plurality of support plates spacedly formed on one retaining wall and extending toward a center of the wheel rim to form a hub hole defined therein, the hub hole axially located at the center of the wheel rim for adapting to assemble with a wheel hub; and
   a brake rotor concentrically connected with the wheel rim and mounted with the other retaining wall of the wheel rim for adapting to be clamped by a disc brake, the brake rotor having a hook portion annularly formed thereon and extending from an outer periphery thereof for buckling with the corresponding retaining wall of the wheel rim, the brake rotor coveringly connected with a lateral surface of the corresponding retaining wall, the hook portion extending toward the annular groove and coveringly connected with an inner surface of the corresponding retaining wall, such that the brake rotor is mounted on the wheel rim;
   whereby when the brake rotor is clamped by the disc brake, the brake rotor is able to generate a relatively greater braking torque for providing an efficient braking.

2. The wheel rim with a brake rotor as claimed in claim 1, wherein the retaining wall, which is connected with the brake rotor, has a plurality of first protrusions spacedly and radially formed on an inner periphery thereof, the first protrusions extending toward the center of the wheel rim, the brake rotor having an outer diameter relatively smaller than that of the wheel rim, the brake rotor having a plurality of second protrusions radially formed on an outer periphery thereof and respectively corresponding to the first protrusions, each second protrusion coveringly connected with a lateral of the corresponding first protrusion and adapting to be fastened with the corresponding first protrusion by a fastener.

\* \* \* \* \*